United States Patent [19]

Chyung et al.

[11] Patent Number: 4,554,197

[45] Date of Patent: Nov. 19, 1985

[54] FIBER REINFORCED GLASS/GLASS-CERAMIC MIRROR BLANKS

[75] Inventors: Kenneth Chyung; Peter C. Schultz; Mark P. Taylor, all of Painted Post, N.Y.

[73] Assignee: Corning Glass Works, Corning, N.Y.

[21] Appl. No.: 621,932

[22] Filed: Jun. 18, 1984

[51] Int. Cl.$^4$ .............................................. B32B 5/12
[52] U.S. Cl. ...................................... 428/113; 264/60; 264/63; 264/65; 264/66; 428/294; 428/408; 428/426; 428/428; 428/697; 428/701; 428/702; 428/912.2
[58] Field of Search .................. 350/609, 631, 641; 501/90, 95; 428/113, 294, 408, 426, 428, 697, 701, 702, 912.2; 156/285; 264/60, 63, 65, 66

[56] References Cited

U.S. PATENT DOCUMENTS

| | | | |
|---|---|---|---|
| 4,132,820 | 1/1979 | Mitoff | 428/137 |
| 4,260,657 | 4/1981 | Loyd et al. | 428/113 |
| 4,341,826 | 7/1982 | Prewo | 428/113 |

*Primary Examiner*—Marion E. McCamish
*Attorney, Agent, or Firm*—C. S. Janes, Jr.

[57] ABSTRACT

This invention relates to the production of mirror blanks comprising a low expansion graphite or SiC fiber reinforced glass-ceramic composite substrate with a surface facing of a glass or glass-ceramic bonded thereto having an expansion closely matching that of the composite.

29 Claims, No Drawings

FIBER REINFORCED GLASS/GLASS-CERAMIC MIRROR BLANKS

BACKGROUND OF THE INVENTION

This invention is directed to the preparation of light weight, hybrid laminated mirror blanks comprising a graphite or silicon carbide fiber/glass-ceramic composite body bonded to a glass or glass-ceramic facing which are especially suitable for use as laser mirror blanks.

The dispersion of inorganic fibers in ceramic, glass, and glass-ceramic bodies to produce composites demonstrating a mechanical strength and, particularly, a toughness and impact resistance which are greater than exhibited in the base body is well known to the art. Fibers of such materials as alumina, aluminosilicate, graphite, silicon carbide, and silicon nitride have been reported as being so dispersed in continuous or non-continuous fashion.

The manner in which the fibers are dispersed and the geometry and location of the fibers within the matrix significantly affect the physical properties displayed by the composite articles. For example, experience has evidenced that the distribution of the reinforcing fibers in several directions within the matrix imparts a mechanical strength, toughness, and impact resistance frequently superior to composites wherein the fibers run in a single direction.

Recently, a method has been developed for fabricating complex shapes wherein the direction and location of the reinforcing fibers can be tailored at will. The method involves the use of "prepregs"; i.e., woven or non-woven sheets of fiber reinforcement which are preimpregnated with a vehicle containing an organic binder and matrix powder. The sheets are thereafter cut into a desired design and stacked in the proper contour for the particular shape to be formed. The prepreg is then consolidated and cured into a laminated composite preform at moderate temperature and pressure. Subsequently, the preform may be repressed to a final shape.

Whether simple hot pressing is employed or the prepreg technique followed, the powdered glass which is the precursor for the glass-ceramic matrix will be crystallized either during the heat treatment inherent in the hot pressing step or in a subsequent heat treatment specifically designed to crystallize the precursor glassy matrix in situ.

U.S. Pat. No. 4,256,378 supplies a recital of prior art dealing with the construction of laser mirrors (noting U.S. Pat. Nos. 3,836,236, 3,926,510, and 3,942,880), and provides an excellent discussion of the structure of laser mirrors, along with the chemical and physical properties that the materials comprising such mirrors should exhibit. The patent mentions the prior use of highly polished metal blocks for high energy laser applications and graphite fiber reinforced resin matrix composites or low expansion glasses for low energy laser applications. However, because of deficiencies witnessed in those products, U.S. Pat. No. 4,256,378 disclosed a laser mirror consisting of graphite fibers dispersed in a glass matrix.

The preferred method described in the patent contemplated passing a tow of graphite fibers through a suspension composed of powdered glass in an organic vehicle and winding the impregnated fibers onto a rotating drum. The glass powder was of such dimensions that at least 90% passed through a 325 mesh screen (44 microns). Excess glass and solvent were removed by pressing a squeegee against the drum as it rotated, and the windings, assuming the structure of a tape, were dried to remove the organic vehicle. Thereafter, the fiber was removed from the drum and cut into strips up to the diameter of the mirror to be fabricated. The strips were then desirably stacked up in alternating 0° and 90° sequences and the assembled composite hot pressed, either in an inert atmosphere or under vacuum, into an integral body. The sole glass utilized in the disclosed composites was Corning Code 7740, a borosilicate glass marketed by Corning Glass Works, Corning, N.Y., having a coefficient of thermal expansion of $32.5 \times 10^{-7}/°$ C. When desired, additional powder and glass could be inserted between each strip as it was laid up to achieve a preferred 40-70% by volume loading of graphite fiber in the composite.

A separate laser reflecting surface was thereafter applied to the composite. The patent noted the conventional use of a chromium-gold alloy for that purpose which could be applied via such conventional methods as spraying, vapor deposition, and cathode sputtering.

U.S. Pat. No. 4,324,843 discloses the fabrication of SiC fiber reinforced glass-ceramic composite articles wherein the glass-ceramic matrix is essentially free from $TiO_2$ and is selected from the group of base composition systems consisting of aluminosilicate, lithium aluminosilicate, and magnesium aluminosilicate. The method for fabricating such articles generally followed the steps outlined above with respect to U.S. Pat. No. 4,256,378. Hence, a tow of SiC fibers was passed through a slip composed of powdered glass of a composition suitable for crystallization in situ to a glass-ceramic, an organic solvent, and organic plasticizer and wound around a rotating spool. The glass powder was so finely divided that, preferably, at least 90% passed through a 325 mesh screen. Excess glass and solvent were removed by pressing a squeegee against the spool as it rotated, and the windings, assuming the structure of a type composed of unidirectional fiber, were dried to eliminate the organic solvent. Subsequently, the tape was removed from the spool and cut into strips to conform to the dimensions of the article desired. Those strips were then laid up in any designed sequence, e.g., 0°/90°, or 0°/30°/60°/90°, or 0°/±45°/90°, and the assembly hot pressed, either in an inert atmosphere or under vacuum, into a unitary body. In general, the temperature of the hot pressing operation will be such as to concurrently cause crystallization in situ of the glassy matrix.

SUMMARY OF THE INVENTION

The objective of the present invention is to fabricate bodies suitable for use as mirror blanks which exhibit the following characteristics:
(a) low thermal expansion;
(b) high thermal conductivity;
(c) minimum outgassing in vacuum or upon heating;
(d) near net shape molding capability;
(e) surface can be highly polished via proven existing technology;
(f) no degradation upon extended exposure to ultraviolet radiation;
(g) high strength and modulus to minimize weight;
(h) high fracture toughness; and
(i) rapid fabrication.

That objective can be achieved through a hybrid laminated structure consisting generally of a substrate composed of a graphite or SiC fiber/glass-ceramic composite to which is bonded a facing of glass or glass-ceramic, the latter facing serving as the reflecting element. A separate reflecting surface component is required because the composite cannot be polished to the demanded optical quality. Glass and very fine-grained glass-ceramic elements are particularly useful since they are highly polishable with known techniques.

In a preferred mode of fabrication, a low expansion glass or glass-ceramic faceplate is bonded to the substrate during the same operation as the consolidation of the composite. In order to insure relatively low residual stress in the faceplate, it is necessary that the composite have a thermal expansion which closely matches that of the glass or glass-ceramic facing. That requirement can be satisfied by selecting a low expansion glass-ceramic matrix composition which compensates for the relatively high negative thermal expansion of the graphite or positive expansion of SiC fibers in the direction perpendicular to the long axis of the fiber.

The glass-ceramic matrix for the graphite or SiC fiber reinforced substrate will commonly have a base composition within the $Li_2O-Al_2O_3-SiO_2$ system with the predominant crystal phase being a beta-quartz or beta-spodumene solid solution. The reflecting facing of glass will customarily be composed of fused silica, e.g. Code 7940 glass, having a coefficient of thermal expansion of about $5 \times 10^{-7}/°$ C. over the temperature range of 0°–300° C., or a low expansion fused $TiO_2-SiO_2$ composition, e.g., Code 7971 glass having a coefficient of thermal expansion of about $0.5 \times 10^{-7}/°$ C. over the temperature range of 0°–300° C. The glass-ceramic reflecting facing will commonly have a composition within the $Li_2O-Al_2O_3-SiO_2$ system wherein the predominant crystal phase is a beta-quartz solid solution (sometimes referred to as beta-eucryptite solid solution). The composition of the glass must be so chosen that it does not readily devitrify or react with the substrate, but yet must demonstrate a sufficiently low viscosity at the consolidation temperature to accommodate the volume change occurring during the consolidation step without building substantial stress. In like manner, a glass-ceramic facing composition must be so selected and so heat treated that it does not crystallize to the opaque phase, i.e., beta-spodumene solid solution instead of beta-quartz solid solution, during the consolidation of the substrate composite. Beta-spodumene solid solution crystals are generally much coarser grained than beta-quartz solid solution crystals and, hence, interfere with the desired polishing capability. Furthermore, beta-spodumene solid solution crystals exhibit an undesirable higher coefficient of thermal expansion.

This preferred mode of fabricating mirror blanks comprises the following five general steps:

(1) unidirectional prepregs in sheet form are prepared consisting of graphite or SiC fibers, an organic binder, and glass powder having a composition within the base $Li_2O-Al_2O_3-SiO_2$ system;

(2) the prepregs are stacked in like or varying fiber orientations, e.g., 0°/0°, 0°/90°, 0°/±45°/90°, or 0°/±60°;

(3) the binder is burned out in a non-oxidizing atmosphere;

(4) a transparent glass, glass-ceramic, or precursor glass for a glass-ceramic plate of a desired configuration, e.g., a near net shape, is placed in contact with a face of the stack of prepregs;

(5) the stack of prepregs is consolidated into a unitary composite body and the glass, glass-ceramic, or precursor glass for a glass-ceramic plate concurrently bonded thereto by heat treatment thereof as, for example, by hot pressing in a non-oxidizing atmosphere thereby forming a laminate; and then (6) the laminate is heat treated in a non-oxidizing atmosphere to cause the composite body and, where present, the precursor glass to crystallize in situ to a glass-ceramic containing beta-quartz solution as the predominant crystal phase.

Normally, the fibers will comprise about 30–70% by volume of the composite, with the preferred content being about 60%.

Numerous modifications in that preferred mode of fabrication are, of course, possible. One such modification involves applying a thin layer of low expansion glass in the form of powder to a surface of the stack of prepregs; this powder is sintered into an integral, flaw-free outer surface during consolidation of the stack of prepregs. Where desired, the composition of the glass powder may be selected such as to comprise a precursor for a transparent glass-ceramic outer surface. This glass powder practice eliminates the need for a shaped preform of the facing material. However, care must be exercised to insure that an integral, completely flaw-free surface is produced. A variation in the glass powder practice involves the application of a surface facing by depositing a layer of fumed oxide particles, e.g., $SiO_2$ particles, onto a surface of the prepreg stack via a flame hydrolysis technique, such as is described in U.S. Pat. Nos. 2,272,342 and 2,326,059, or by depositing a glass layer onto a surface of the prepreg stack via a gelation technique, such as is disclosed in pending U.S. application Ser. Nos. 508,185 and 524,372; Ser. No. 508,185 having been filed June 27, 1983, in the name of George W. Scherer under the title *Method of Forming Glass or Ceramic Article* and Ser. No. 524,372 having been filed Aug. 18, 1983 in the name of George W. Scherer under the title *Method of Forming a Glass or Ceramic Article*. Care must be exercised during the sintering or consolidation of the particles into an integral, flaw-free surface layer to avoid reaction between the particles and the substrate and/or thermal deformation of the substrate.

In yet another process variation, the prepreg stack may be consolidated into a unitary composite body and the body crystallized in situ to a glass-ceramic. Thereafter, the transparent glass, glass-ceramic, or precursor glass for a glass-ceramic plate, either in the form of a powder or as a shaped preform, is placed into contact with the body, and that assembly fired to produce a laminate consisting of a flaw-free surface facing integrally bonded to the composite body. Where said precursor glass is present, the laminate will be heat treated to crystallize that glass in situ. The consolidation and the crystallization in situ of the composite body will be carried out in a non-oxidizing environment. The subsequent bonding operation and, where necessary, the second crystallization steps will preferably be undertaken in a non-oxidizing atmosphere, but such environment is not absolutely essential.

That embodiment quite obviously requires a second firing step (for bonding the surface facing), but it permits the volume production of unitary prepreg masses to which the desired mirror surface facing can be bonded; the composition of that facing being selected in light of the properties desired. Again, caution must be observed to avoid reaction between the surface facing and the substrate composite and/or to avoid thermal deformation of the substrate composite.

The physical and chemical properties of the glass-ceramic matrix of the fiber reinforced composite may be advantageously modified by the inclusion of moderate amounts of compatible metal oxides. For example, additions of MgO and/or ZnO yield crystal phases in the $Li_2O-Al_2O_3-SiO_2$ base system which are solid solutions containing MgO and/or ZnO. The presence of $TiO_2$ and/or $ZrO_2$ may improve nucleation with consequent overall finer-grained crystallization. It has been observed that better bonding between the matrix and graphite or SiC fibers can be achieved where oxidizing agents such as the alkali metal oxides and ammonium nitrate are present in the starting batch. Nevertheless, caution must be exercised in the use of alkali metal oxides, particularly $Na_2O$, because a reaction can occur between $Na_2O$ and the fused $SiO_2$ glass or fused $SiO_2$-$TiO_2$ glass. Accordingly, prudence dictates that, where alkali metal oxides other than $Li_2O$ are included in the base composition, a layer of glass powder essentially free from alkali metal oxides other than $Li_2O$ be placed on the surface of the stack of prepregs which will be in contact with the reflecting element.

The preferred matrix compositions will consist essentially, in weight percent on the oxide basis, of about

| | | | | | |
|---|---|---|---|---|---|
| $Li_2O$ | 1–5 | ZnO | 0–13 | $ZrO_2$ | 0–2.5 |
| $Al_2O_3$ | 17–24 | $Na_2O$ | 0–2 | $Cs_2O$ | 0–5 |
| $SiO_2$ | 60–68 | $K_2O$ | 0–3 | BaO | 0–4 |
| MgO | 0.5–3 | $TiO_2$ | 0–4.5 | $Nb_2O_5$ | 0–5 |
| | | $As_2O_3$ | 0–1 | | |

One method for forming the desired composite mirror blanks where the surface facing material desired to be utilized reacts with the substrate or is incompatible with the thermal treatment required in the consolidation of the substrate composite body, involves the use of frit bonding in a subsequent separate step. As an illustration of that practice, ridges can be molded into the substrate during hot pressing and a transparent glass or glass-ceramic facing bonded at those ridges via glass frit.

DESCRIPTION OF PREFERRED EMBODIMENTS

EXAMPLE I

Prepreg sheets were produced in a manner similar to that described in U.S. Pat. Nos. 4,256,378 and 4,324,843, supra. Hence, an aqueous slip was prepared containing 500 grams of a glass powder having the $Li_2O-Al_2O_3-SiO_2$ base composition tabulated below, expressed in terms of parts by weight on the oxide basis, 310 grams of isopropyl alcohol as a dispersing control agent, 10 grams of Rohm and Haas Tamol as a wetting agent, 240 grams of Rohm and Haas HA-8 as an acrylic binder, 18 grams of Rohm and Haas Acrysol as a viscosity control agent, and 924 ml water. The glass powder having the following composition was comminuted such that at least 90% passed a 325 United States Standard Sieve. Inasmuch as the sum of the components approximates 100, for all practical purposes the reported values may be deemed to represent weight percent.

| | | | |
|---|---|---|---|
| $SiO_2$ | 66.29 | BaO | 1.00 |
| $Al_2O_3$ | 19.31 | $ZrO_2$ | 2.00 |
| $Li_2O$ | 2.72 | $Nb_2O_5$ | 5.00 |

| -continued | | | |
|---|---|---|---|
| MgO | 2.70 | $As_2O_3$ | 1.00 |

A yarn of Hercules HMS graphite fiber, containing 12,000 fibers/tow, was unwound from a spool and passed through the slip to impregnate the tow, and then re-wound onto a faceted drum which was rotating at a linear speed of about five feet/minute. The wound yarn having the fibers oriented in a single direction was dried by overnight exposure to air at ambient temperature. After drying, the fiber was removed from the drum, cut in 4"×4" sheets, and stacked in a steel cassette, some stacks having 0°/0° fiber orientation and others with alternating 0°/90° fiber orientations. The organic components were burned out by firing the cassette at 450° C. for two hours in a nitrogen atmosphere.

A 4"×4"×0.125" plate of fused $SiO_2$ (Code 7940 glass) was placed onto the bottom plunger of a graphite mold with a sheet of molybdenum separating the plate from the graphite plunger. The prepreg stack was positioned atop the fused silica plate. A sheet of molybdenum and the graphite top plunger were placed atop the prepreg and the mold closed. The composite was consolidated and the silica plate bonded thereto by hot pressing in an inert atmosphere. The specific temperatures and pressures employed will vary with the compositions of the materials involved, but the process generally involves the following schedule:

(a) the mold is heated in a non-oxidizing atmosphere, e.g., argon, nitrogen, or vacuum, to a temperature corresponding to a matrix viscosity of less than $10^{12}$ poises and, preferably, greater than $10^8$ poises;

(b) sufficient pressure is applied to the mold to overcome the mechanical resistance of the fibers;

(c) while maintaining pressure, the mold is heated to and held at a temperature sufficiently high to consolidate the prepreg stack into an integral body and to bond the silica plate thereto, that temperature generally ranging about 950°–1400° C.;

(d) while maintaining pressure, the mold is cooled to a temperature corresponding to a matrix viscosity greater than $10^{12}$ poises;

(e) the mold is held at a crystallization temperature of the matrix (commonly about 850°–1100° C.) for a sufficient length of time to cause crystallization in situ of the β-quartz solid solution; pressure may or may not be maintained during this step, depending upon the matrix viscosity during crystallization; and then (f) the composite article is cooled to room temperature.

Typically, a pressure greater than 500 psi, desirably about 1000 psi, will be utilized. Higher pressures may, of course, be employed but provide no substantive improvement in the final product. Nitrogen comprises the preferred non-oxidizing environment. Normally, the consolidation temperature will be held for a period of time of about 10–20 minutes and crystallization will be complete within about 0.2–6 hours.

As is evident from the schedule, the pressing is undertaken at a sufficiently high temperature to impart a relatively low viscosity to the glass powder and the fused silica plate, thereby insuring good sintering or fusion of the glass powder to consolidate it into an integral body and develop a flaw-free bond between the composite substrate and the glass plate. That temperature is also too high to permit the growth of crystals in the glass of the composite. The desired beta-quartz solid solution crystals are generated in the above glass composition at temperatures preferably between about 900°–1050° C. As is well known, crystallization proceeds more rapidly as the temperature is elevated. Accordingly, practicality dictates that temperatures in the vicinity of 1000° C. will be used. Care must be exercised in the crystallization step, however, since temperatures in excess of 1100° C. lead to the crystallization of beta-spodumene solid solution instead of the desired beta-quartz solid solution as the predominant crystal phase.

The thermal expansion of a graphite fiber/LAS ($Li_2O$-$Al_2O_3$-$SiO_2$) composite having an 0°/0° fiber orientation was measured at −0.20 ppm (parts per million)/° C. parallel to the fibers and +1.13 ppm/° C. perpendicular to the fibers over the range 25°–100° C. The expansion perpendicular to the fibers is much lower than previously reported for a graphite fiber/Code 7740 glass composite (U.S. Pat. No. 4,256,378), as can be seen below:

| Composite | Composite Expansion (ppm/°C.) | |
|---|---|---|
| | Parallel Expansion | Perpendicular Expansion |
| Graphite/7740 | −0.51 | +4.5 |
| Graphite/LAS | −0.20 | +1.13 |

Consequently, the faceplate and the graphite fiber/LAS composite will be much more closely matched in expansion, thereby resulting in lower stress on the faceplate. Thus, the stress in the faceplate bonded to the graphite fiber/LAS composite has been observed at no more than about 700 psi, whereas the stress in the faceplate bonded to the graphite fiber/7740 glass composite is much higher.

EXAMPLE II

The preparation of prepreg sheets and the lay-up procedure therefor were the same as described above in Example I except that all of the stacks contained sheets having a 0°/0° fiber orientation. The matrix composition had the following approximate composition, expressed in terms of parts by weight on the oxide basis. Again, because the sum of the ingredients closely approximates 100, the recited values may be considered to reflect weight percent.

| $SiO_2$ | 63.4 | MgO | 1.0 |
|---|---|---|---|
| $Al_2O_3$ | 20.5 | $Li_2O$ | 1.5 |
| ZnO | 10.4 | $Cs_2O$ | 3.3 |

The composition falls within the ranges disclosed in U.S. Pat. No. 4,315,991 and crystallizes in situ upon heat treatment to bodies containing zinc beta-quartz as the predominant crystal phase. A faceplate of Code 7971 fused $TiO_2$-$SiO_2$ glass provided the mirror element.

The hot pressing process employed a nitrogen atmosphere and a pressure of about 1000 psi. A temperature of approximately 1000° C. and a time of 10 minutes were utilized in consolidating the prepreg stack and bonding the $TiO_2$-$SiO_2$ plate thereto, and a crystallization cycle of about 1000° C. for about 20 minutes developed fine-grained $\beta$-quartz solid solution.

The faceplate was well bonded to the composite with no evidence of devitrification. (Over heat treatment of the composite should be avoided, because the presence of $TiO_2$ increases the tendency of the glass to devitrify.) The composite body was well densified with a uniaxial strength of 79 Kpsi and a modulus of 23.2 Mpsi, both measured in the longitudinal direction.

We claim:

1. A mirror blank comprising a laminate consisting of a low expansion graphite or SiC fiber/glass-ceramic composite substrate and a mirror surface facing of a glass or glass-ceramic bonded thereto having an expansion closely matching that of said substrate.

2. A mirror blank according to claim 1 wherein said graphite or SiC fiber comprises about 30–70% by volume of said composite.

3. A mirror blank according to claim 1 wherein said glass-ceramic of said composite has a base composition in the general system $Li_2O$-$Al_2O_3$-$SiO_2$.

4. A mirror blank according to claim 3 wherein said glass-ceramic contains beta-quartz solid solution as the predominant crystal phase.

5. A mirror blank according to claim 3 wherein said glass-ceramic consists essentially, in weight percent on the oxide basis, of about

| $Li_2O$ | 1–5 | ZnO | 0–13 | $ZrO_2$ | 0–2.5 |
|---|---|---|---|---|---|
| $Al_2O_3$ | 17–24 | $Na_2O$ | 0–2 | $Cs_2O$ | 0–5 |
| $SiO_2$ | 60–68 | $K_2O$ | 0–3 | BaO | 0–4 |
| MgO | 0.5–3 | $TiO_2$ | 0–4.5 | $Nb_2O_5$ | 0–5 |
| | | $As_2O_3$ | 0–1 | | |

6. A mirror blank according to claim 1 wherein said surface facing consists of fused silica glass.

7. A mirror blank according to claim 1 wherein said surface facing consists of a low expansion, fused titania-silica glass.

8. A mirror blank according to claim 1 wherein said surface facing consists of a transparent glass-ceramic containing beta-quartz solid solution as the predominant crystal phase.

9. A mirror blank according to claim 1 wherein said graphite or SiC fibers are present in alternating orientations to minimize the anisotropy of the physical properties exhibited by the composite.

10. A mirror blank according to claim 1 wherein said fibers comprise about 30–70% by volume of said composite substrate.

11. A method for making a mirror blank comprising a laminate consisting of a graphite or SiC fiber/glass-ceramic composite substrate and a mirror surface facing of a glass or glass-ceramic bonded thereto which comprises the steps of:

(a) preparing unidirectional prepregs in sheet form consisting of graphite or SiC fibers, an organic binder, and glass powder having a base composition within the general $Li_2O$-$Al_2O_3$-$SiO_2$ composition system;

(b) stacking said prepregs;

(c) burning out said binder in a non-oxidizing atmosphere;

(d) placing a low expansion transparent glass, glass-ceramic, or precursor glass for a low expansion glass-ceramic plate into contact with a face of said stack of prepregs;

(e) exposing said stack of prepregs with said transparent glass, glass-ceramic, or precursor glass for a glass-ceramic plate in contact therewith to a non-oxidizing atmosphere at a temperature and for a time sufficient to consolidate said stack into an integral composite body and to bond said plate to said composite body, thereby forming a laminate;

(f) exposing said laminate in a non-oxidizing atmosphere to a temperature and for a time sufficient to cause said composite body and, where present, said precursor glass to crystallize in situ to a glass-ceramic containing beta-quartz solid solution as the predominant crystal phase.

12. A method according to claim 11 wherein said fibers are in an orientation selected from the group of 0°/0°, 0°/90°, 0°/±45°/90°, and 0°/±60°.

13. A method according to claim 11 wherein said low expansion glass is selected from the group of fused silica and a fused titania-silica composition.

14. A method according to claim 11 wherein said low expansion glass-ceramic contains beta-quartz solid solution as the predominant crystal phase.

15. A method according to claim 11 wherein said glass powder consists essentially, in weight percent on the oxide basis, of about

| $SiO_2$ | 60–68 | ZnO | 0–13 | $ZrO_2$ | 0–2.5 |
|---|---|---|---|---|---|
| $Al_2O_3$ | 17–24 | $Na_2O$ | 0–2 | $Cs_2O$ | 0–5 |
| $Li_2O$ | 1–5 | $K_2O$ | 0–3 | BaO | 0–4 |
| MgO | 0.5–3 | $TiO_2$ | 0–4.5 | $Nb_2O_5$ | 0–5 |
| | | $As_2O_3$ | 0–1 | | |

16. A method according to claim 11 wherein said fibers comprise about 30–70% by volume of said composite.

17. A method according to claim 11 wherein said temperature to consolidate said stack into an integral composite body and to bond said plate to said composite body ranges between about 950°–1400° C.

18. A method according to claim 11 wherein said temperature to cause said composite body and, where present, said precursor glass to crystallize in situ ranges between about 850°–1100° C.

19. A method according to claim 11 wherein said consolidation is carried out by hot pressing.

20. A method for making a mirror blank comprising a laminate consisting of a graphite or SiC fiber/glass-ceramic composite substrate and a mirror surface of a glass or glass-ceramic bonded thereto which comprises the steps of:
(a) preparing unidirectional prepregs in sheet form consisting of graphite or SiC fibers, an organic binder, and glass powder having a base composition within the general $Li_2O-Al_2O_3-SiO_2$ composition system;
(b) stacking said prepregs;
(c) burning out said binder in a non-oxidizing atmosphere;
(d) exposing said stack of prepregs to a non-oxidizing atmosphere at a temperature for a time sufficient to consolidate said stack into an integral composite body.

(e) exposing said composite body to a non-oxidizing atmosphere at a temperature and for a time sufficient to cause said body to crystallize in situ to a glass-ceramic containing beta-quartz solid solution as the predominant crystal phase;
(f) placing a low expansion transparent glass, glass-ceramic, or precursor glass for a low expansion glass-ceramic plate into contact with a face of said composite body;
(g) exposing said composite body with said transparent glass, glass-ceramic, or precursor glass for a glass-ceramic plate in contact therewith to a temperature and for a time sufficient to bond said plate to said composite body, thereby forming a laminate; and, where said precursor glass is present,
(h) exposing said laminate to a temperature and for a time sufficient to cause said precursor glass to crystallize in situ to a glass-ceramic containing beta-quartz solid solution as the predominant crystal phase.

21. A method according to claim 20 wherein said fibers are in one orientation selected from the group of 0°/0°, 0°/90°, 0°/±45°/90°, and 0°/±60°.

22. A method according to claim 20 wherein said low expansion glass is selected from the group of fused silica and a fused titania-silica composition.

23. A method according to claim 20 wherein said low expansion glass-ceramic contains beta-quartz solid solution as the predominant crystal phase.

24. A method according to claim 20 wherein said glass powder consists essentially, in weight percent on the oxide basis, of about

| $SiO_2$ | 60–68 | ZnO | 0–13 | $ZrO_2$ | 0–2.5 |
|---|---|---|---|---|---|
| $Al_2O_3$ | 17–24 | $Na_2O$ | 0–2 | $Cs_2O$ | 0–5 |
| $Li_2O$ | 1–5 | $K_2O$ | 0–3 | BaO | 0–4 |
| MgO | 0.5–3 | $TiO_2$ | 0–4.5 | $Nb_2O_5$ | 0–5 |
| | | $As_2O_3$ | 0–1 | | |

25. A method according to claim 20 wherein said fibers comprise about 30–70% by volume of said composite.

26. A method according to claim 20 wherein said temperature to consolidate said stack into an integral composite body ranges between about 950°–1400° C.

27. A method according to claim 20 wherein said temperature to bond said plate to said composite body ranges between about 950°–1400° C.

28. A method according to claim 20 wherein said temperature to cause said composite body and, where present, said precursor glass to crystallize in situ ranges between about 850°–1100° C.

29. A method according to claim 20 wherein said consolidation is carried out by hot pressing.

* * * * *